(12) United States Patent
Miloskovska et al.

(10) Patent No.: US 11,512,169 B2
(45) Date of Patent: Nov. 29, 2022

(54) SEMICRYSTALLINE POLYPHENYLSULFONE AND ASSOCIATED METHOD OF MAKING AND METHOD OF ADDITIVE MANUFACTURING

(71) Applicant: SHPP Global Technologies B.V., Bergen op Zoom (NL)

(72) Inventors: Elena Miloskovska, Breda (NL); Bruke Jofore, Bergen op Zoom (NL); Robert Russell Gallucci, Mt. Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/973,893

(22) PCT Filed: Jun. 26, 2019

(86) PCT No.: PCT/US2019/039213
§ 371 (c)(1),
(2) Date: Dec. 10, 2020

(87) PCT Pub. No.: WO2020/006061
PCT Pub. Date: Jan. 2, 2020

(65) Prior Publication Data
US 2021/0340328 A1 Nov. 4, 2021

Related U.S. Application Data

(60) Provisional application No. 62/690,453, filed on Jun. 27, 2018.

(30) Foreign Application Priority Data

Oct. 2, 2018 (EP) .................................... 18198174

(51) Int. Cl.
*C08G 75/23* (2006.01)
*B29C 64/153* (2017.01)
(Continued)

(52) U.S. Cl.
CPC ............ *C08G 75/23* (2013.01); *B29C 64/153* (2017.08); *B29C 64/268* (2017.08); *C08L 81/06* (2013.01);
(Continued)

(58) Field of Classification Search
CPC ....... C08J 2381/06; C08J 5/18; C08G 75/205; C08G 75/23; C08G 65/40; G01N 2030/486; C08L 81/06
See application file for complete search history.

(56) References Cited

U.S. PATENT DOCUMENTS 4,008,203 A    2/1977  Jones
4,175,175 A *  11/1979 Johnson ............. C08G 65/4006
                                              525/434
(Continued)

FOREIGN PATENT DOCUMENTS

CN    101139441 A    3/2008
EP      2287236 A1   2/2011
(Continued)

OTHER PUBLICATIONS

Chan et al., "Facile quantitative Analysis of Hydroxyl End Groups of Poly(2,6-dimethyl-1,4-phenylene oxide)s by 31P NMR Spectroscopy" Macromolecules (1994), vol. 27, pp. 6371-6375.
(Continued)

*Primary Examiner* — Shane Fang
(74) *Attorney, Agent, or Firm* — Cantor Colburn LLP

(57) ABSTRACT

A semicrystalline polyphenylsulfone, has the structure Formula (I) wherein n and R are defined herein. The semicrys-
(Continued)

talline polyphenylsulfone, which exhibits a crystalline melting point in a range of 215 to 270° C., can be prepared from amorphous polyphenylsulfone using a solvent-induced crystallization method. An additive manufacturing method utilizing particles of the semicrystalline polyphenylsulfone is described.

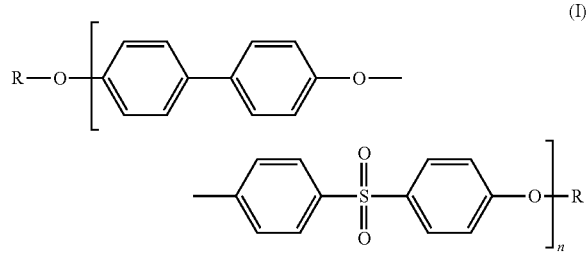

(I)

15 Claims, 1 Drawing Sheet

(51) Int. Cl.
B29C 64/268 (2017.01)
C08L 81/06 (2006.01)
B29K 81/00 (2006.01)

(52) U.S. Cl.
CPC ...... B29K 2081/06 (2013.01); C08G 2250/00 (2013.01)

(56) References Cited

U.S. PATENT DOCUMENTS

| | | | |
|---|---|---|---|
| 5,492,993 | A | 2/1996 | Saam et al. |
| 6,197,924 | B1 | 3/2001 | Takekoshi |
| 7,084,232 | B2 | 8/2006 | Kim et al. |
| 9,040,651 | B2 | 5/2015 | Lutz et al. |
| 9,527,242 | B2 | 12/2016 | Rodgers et al. |
| 2013/0109831 | A1 | 5/2013 | Lutz et al. |
| 2014/0142250 | A1 | 5/2014 | Lee et al. |
| 2018/0371171 | A1 | 12/2018 | Kohinata |

FOREIGN PATENT DOCUMENTS

| | | |
|---|---|---|
| EP | 3388469 A1 | 10/2018 |
| JP | 6172586 B2 | 6/2017 |
| WO | 0166090 A1 | 9/2001 |
| WO | 2008090235 A2 | 7/2008 |
| WO | 2008090235 A3 | 7/2008 |
| WO | 2009077553 A1 | 6/2009 |

OTHER PUBLICATIONS

Gondo, et al., "Effects of Alcohol Solvent-induced Crystallization on biodegradable Poly(Lactic Acid) Film" Journal of Packaging Science and Technology (2011) vol. 20 No 6, pp. 501-511 (translation of abstract only).

International Search Report dated Aug. 12, 2019; International Application No. PCT/US2019/039213; International Filing Date Jun. 26, 2019 (7 pgs).

Liu, et al., "Solven-Induced Crystallization of Nylon-6I", Journal of Polymer Science: Part B: Polymer Physics, vol. 33 (1995), pp. 619-627.

Snyder et al., "Classification of the Solvent Properties of Common Liquids" Journal of Chromatographic Science vol. 16, Jun. 1978, pp. 223-234.

Written Opinion dated Jan. 7, 2020; International Application No. PCT/US2019/039213; International Filing Date Mar. 26, 2019 (9 pgs).

Written Opinion dated Aug. 12, 2019; International Application No. PCT/US2019/039213; International Filing Date Mar. 26, 2019 (7 pgs).

SOLVAY asking more from chemistry®, Radel® PPSU, Udel® PSU, VeradelV PESU & Acudel® modified PPSU Processing Guide (2014) 28 pgs.

Wikipedia definition "Polyphenysulfone" obtained online May 16, 2022 "http://en.wikipedia.org/w/index.php?title=Polyphenylsulfone&oldid=1074741602" (1 pg).

* cited by examiner

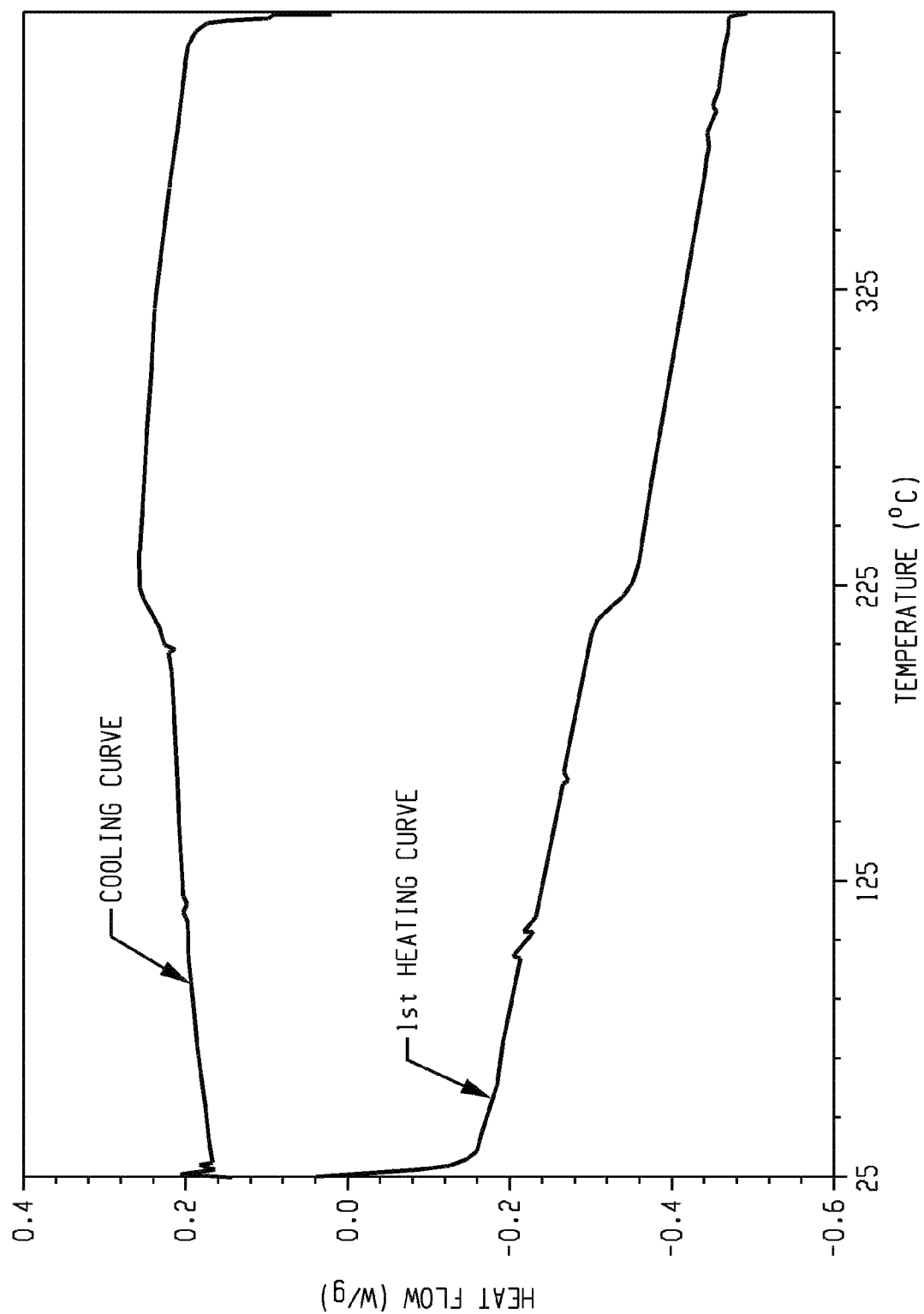

SEMICRYSTALLINE POLYPHENYLSULFONE AND ASSOCIATED METHOD OF MAKING AND METHOD OF ADDITIVE MANUFACTURING

CROSS-REFERENCE TO RELATED APPLICATIONS

This application is a National Stage application of PCT/US2019/039213, filed Jun. 26, 2019, which claims the benefit of U.S. Provisional Application No. 62/690,453 filed Jun. 27, 2018, and European Application No. 18198174.7 filed Oct. 2, 2018, all of which are incorporated by reference herein in their entirety.

BACKGROUND OF THE INVENTION

Polyphenylsulfones are high-performance polymers exhibiting a desirable combination of heat resistance, chemical resistance, and transparency. As commercially supplied, polyphenylsulfones are amorphous polymers, lacking any crystallinity. For this reason, they cannot be used in applications that require a semicrystalline polymer. Such applications include, for example, the selective laser sintering and jet fusion methods of additive manufacturing.

A method of preparing semicrystalline polyphenylsulfone has been reported in U.S. Pat. No. 6,197,924 to Takekoshi, issued 6 Mar. 2001. However, in Takekoshi's method, the product semicrystalline polyphenylsulfone is hydroxyl-terminated and therefore vulnerable to oxidation, crystallization of the polyphenylsulfone occurs in a polymerization reaction mixture, and crystallization of the polyphenylsulfone preferably utilizes a halogenated aromatic solvent, such as ortho-dichlorobenzene. There is a desire for a method of preparing semicrystalline polyphenylsulfone that is independent of polymerization conditions, does not require halogenated aromatic solvents, and yields a semicrystalline polyphenylsulfone with a low content of hydroxyl groups.

BRIEF SUMMARY OF EMBODIMENTS OF THE INVENTION

One embodiment is a semicrystalline polyphenylsulfone, wherein the semicrystalline polyphenylsulfone has the structure

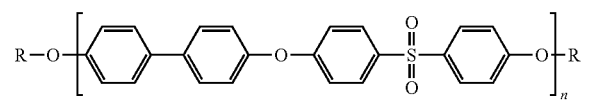

wherein n is, on average, 30 to 200, and each occurrence of R is independently $C_1$-$C_{18}$ alkyl or $C_6$-$C_{18}$ aryl; and wherein the semicrystalline polyphenylsulfone exhibits a crystalline melting point in a range of 215 to 270° C., determined according to ASTM D3418-15 by differential scanning calorimetry using a heating rate of 20° C./minute.

Another embodiment is a method of forming a semicrystalline polyphenylsulfone, the method comprising: combining a solvent mixture with an amorphous polyphenylsulfone powder in a weight ratio of 1:1 to 100:1, respectively, to form a mixture; wherein the solvent mixture comprises a solvent for the polyphenylsulfone and a non-solvent for the polyphenylsulfone in a weight ratio of 0.5:1 to 10:1, respectively; agitating the mixture for a time of 5 to 500 minutes and at a temperature of 10 to 50° C. to form a dispersion of semicrystalline polyphenylsulfone particles; and isolating the semicrystalline polyphenylsulfone particles from the dispersion.

Another embodiment is a method of additive manufacturing, the method comprising: depositing a first layer comprising semicrystalline polyphenylsulfone particles at a working area; irradiating the working area with first radiation effective to heat the first layer to a temperature below and within 10° C. of a crystalline melting onset temperature of the semicrystalline polyphenylsulfone particles; and irradiating the working area with second radiation effective to heat the first layer to a temperature above a crystalline melting point of the semicrystalline polyphenylsulfone particles.

These and other embodiments are described in detail below.

BRIEF DESCRIPTION OF THE DRAWING

The FIGURE shows differential scanning calorimetry heating and cooling cures for an amorphous polyphenylsulfone obtained as RADEL™ R5100-5 polyphenylsulfone from Solvay.

DETAILED DESCRIPTION OF THE INVENTION

The present inventors have determined that a semicrystalline polyphenylsulfone can be prepared by solvent-induced crystallization using a mixture of a solvent and a non-solvent. The molecules of the semicrystalline polyphenylsulfone are end-capped, which makes them more oxidation resistant than polyphenylsulfones with hydroxyl end groups. And its crystallinity allows the semicrystalline polyphenylsulfone to be used in additive manufacturing techniques that require a semicrystalline polymer, thereby permitting fabrication of additively manufactured articles that benefit from the heat resistance, chemical resistance, and transparency of the polyphenylsulfone.

Thus, one embodiment is a semicrystalline polyphenylsulfone, wherein the semicrystalline polyphenylsulfone has the structure

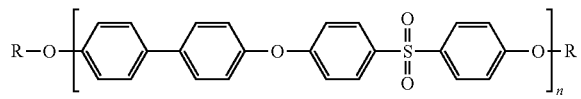

wherein n is, on average, 30 to 200, and each occurrence of R is independently $C_1$-$C_{18}$ alkyl or $C_6$-$C_{18}$ aryl; and wherein the semicrystalline polyphenylsulfone exhibits a crystalline melting point in a range of 215 to 270° C., determined according to ASTM D3418-15 by differential scanning calorimetry using a heating rate of 20° C./minute.

When not modified by "amorphous" or "semicrystalline," the term "polyphenylsulfone" can refer to an amorphous solid form, a semicrystalline solid form, or a molten form.

The semicrystalline polyphenylsulfone has the structure

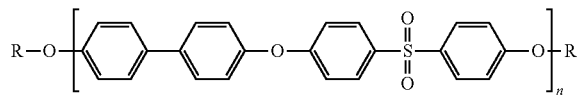

wherein n is, on average, 30 to 200, and each occurrence of R is independently $C_1$-$C_{18}$ alkyl or $C_6$-$C_{18}$ aryl group, Within the range of 30 to 200, the number of repeat units, n, can be in the range of 35 to 150, or in the range of 40 to 100. In some embodiments, each occurrence of R is independently $C_1$-$C_{18}$ alkyl. In some embodiments, each occurrence of R is methyl. Methods of forming end-capped polyphenylsulfones are described in, for example, U.S. Pat. No. 9,040,651 to Lutz et al., issued 26 May 2015.

One consequence of the polyphenylsulfone having terminal R groups as defined above is that the polyphenylsulfone has a very low concentration of hydroxyl groups. For example, in some embodiments the polyphenylsulfone has less than or equal to 50 parts per million by weight of hydroxyl groups, based on the number average molecular weight of the polyphenylsulfone. Within this limit, the hydroxyl group content can be less than or equal to 35 parts per million by weight, or less than or equal to 20 parts per million by weight. Hydroxyl end group content can be determined according to the method of U.S. Pat. No. 9,040,651 B2 to Lutz et al., issued May 26, 2015, column 13, lines 40-57. In that method, 225 milligrams of polymer were combined with 4 milliliters of 0.5 M chromium acetylacetonate in chloroform having a known concentration of internal standard. The sample was shaken to dissolve the polymer. Once the polymer was dissolved, the resulting solution was treated with an excess of 1,2-phenylene phosphorochloridite and transferred immediately to a 5 or 10 millimeter diameter nuclear magnetic resonance (NMR) sample tube, and $^{31}$P NMR shifts were recorded with a pulse width of 35°, 32,000 or 64,000 data points per scan, 1.8 second delay, and 1600-2500 scans. The parts per million by weight of hydroxyl end groups (ppm OH) was calculated according to the equation, ppm OH=(weight of standard/molecular weight of standard)×(integral OH/integral standard)× 17.01×(1/weight of polymer)×(4 mL/100 mL)

An equivalent method of determining the hydroxyl end group content of an aromatic polymer is described in K. P. Chan, D. S. Argyropoulos, D. M. White, G. W. Yeager, and A. S. Hay, "Facile Quantitative Analysis of Hydroxyl End Groups of Poly(2,6-dimethyl-1,4-phenylene oxide)s by $^{31}$P NMR Spectroscopy," *Macromolecules*, 1994, volume 27, pages 6371-6375.

The semicrystalline polyphenylsulfone exhibits a crystalline inciting point in a range of 21.5 to 270° C., determined according to ASTM D3418-15 by differential scanning calorimetry using a heating rate of 20° C./minute. In some embodiments, the lower limit of the crystalline melting point range is 220° C., or 225° C., or 226° C., or 228° C., or 230° C., or 232° C., or 234° C., or 236° C. In some embodiments, the upper limit of the crystalline melting point range is 265° C., or 262° C., or 260° C., or 258° C., or 256° C. In some embodiments, the crystalline melting point is in the range of 230 to 260° C. In some embodiments, the crystalline melting point is associated with a heat of fusion (ΔH) in the range of 1 to 25 joules/gram. Heat of fusion is also determined according to ASTM D3418-15 by differential scanning calorimetry using a heating rate of 20° C./minute.

In some embodiments, the semicrystalline polyphenylsulfone exhibits two crystalline inciting points in the range of 215 to 270° C. In these polymorphic embodiments, the two crystalline melting points can be determined according to ASTM D3418-15 by differential scanning calorimetry using a heating rate of 20° C./minute.

In some embodiments, a molten polyphenylsulfone obtained on melting the semicrystalline polyphenylsulfone exhibits a zero-shear viscosity in the range of 10 to $10^4$ Pascal-second determined according to ASTM D4440-15 at a temperature of 380° C. Zero-shear viscosity can be determined from a frequency sweep rheological experiment using a rheometer (e.g., an ARES-G2 rheometer from TA Instruments), and fit the frequency sweep data with the Carreau-Yasuda model to determine zero-shear viscosity. See, e.g., F. A. Morrison, "*Understanding Rheology,*" 2001, New York: Oxford University Press, pages 231-232. It will be understood that the zero-shear viscosity in the range of 10 to $10^4$ Pascal-second is observed not just at 380° C., but at a range of temperatures above the polyphenylsulfone's crystalline melting point(s) and below the polyphenylsulfone's degradation temperature.

For additive manufacturing techniques such as selective laser sintering and jet fusion, it is useful to have a particulate form of the semicrystalline polyphenylsulfone. For example, in some embodiments the semicrystalline polyphenylsulfone is in the form of particles having a volume-based equivalent spherical diameter (Dv50) in the range of 10 to 400 micrometers, determined by laser diffraction according to ISO 13320-1, Within this range, the equivalent spherical diameter can be in the range of 10 to 200 micrometers, or in the range of 10 to 100 micrometers, or in the rang, of 30 to 90 micrometers, or in the range of 45 to 80 micrometers. The population of particles can have a Dv10 value in the range of 1 to 45 micrometers, and a Dv90 value in the range of 80 to 125 micrometers. The population of particles can have a polydispersity greater than 1 and less than 2, or greater than 1 and less than 1.5. Mastersizer™ particle size analyzers from Malvern Instruments are suitable laser diffraction instruments for determining particle size characteristics.

In some embodiments of the semicrystalline polyphenylsulfone, the crystalline melting point is associated with an enthalpy of crystalline melting of at least 1 joule/gram.

In a very specific embodiment of the semicrystalline polyphenylsulfone, each occurrence of R is methyl; a molten polyphenylsulfone obtained on melting the semicrystalline polyphenylsulfone exhibits a zero-shear viscosity in the range of 10 to $10^4$ Pascal-second determined according to ASTM D4440-15 at a temperature of 380° C.; the semicrystalline polyphenylsulfone is in the form of particles having a volume-based equivalent spherical diameter in the range of 10 to 400 micrometers, determined by laser diffraction according to ISO 13320-1; and the semicrystalline polyphenylsulfone has a hydroxyl end group content greater than 0 and less than 50 parts per million by weight, based on the weight of the semicrystalline polyphenylsulfone. Optionally in this embodiment, the crystalline melting point is associated with an enthalpy of crystalline melting of at least 1 joule/gram.

Another embodiment is a method of forming a semicrystalline polyphenylsulfone, the method comprising: combining a solvent mixture with an amorphous polyphenylsulfone powder in a weight ratio of 1:1 to 100:1, respectively, to form a mixture; wherein the solvent mixture comprises a solvent for the polyphenylsulfone and a non-solvent for the polyphenylsulfone in a weight ratio of 0.5:1 to 10:1, respectively; agitating the mixture for a time of 5 to 500 minutes and at a temperature of 10 to 50° C. to form a dispersion of semicrystalline polyphenylsulfone particles; and isolating the semicrystalline polyphenylsulfone particles from the dispersion.

The method employs a solvent mixture that comprises a solvent for the polyphenylsulfone and a non-solvent for the polyphenylsulfone. In some embodiments, the solvent for the polyphenylsulfone is characterized by a polarity in the range of 4 to 8, and a boiling point at atmospheric pressure in the range of 60 to 190° C. Within the range of 4 to 8, the polarity of the solvent for the polyphenylsulfone can be in the range of 4 to 7.5. Solvent polarity is described in L. R. Snyder, "Classification of the Solvent Properties of Common Liquids," *Journal of Chromatographic Science,* 1978, volume 16, pages 223-234. Examples of solvents for the polyphenylsulfone include dimethylacetamide, dimethylformamide, tetrahydrofuran, pyridine, and combinations thereof.

In some embodiments, the non-solvent for the polyphenylsulfone is characterized by a boiling point at atmospheric pressure in the range of 60 to 125° C. Examples of non-solvents for the polyphenylsulfone include $C_1$-$C_6$ alcohols, $C_3$-$C_6$ ketones, and combinations thereof. In some embodiments, the non-solvent for the polyphenylsulfone is selected from the group consisting of methanol, ethanol, n-propanol, and i-propanol. In some embodiments, the non-solvent for the polyphenylsulfone comprises methanol.

The solvent mixture comprises the solvent for the polyphenylsulfone and the non-solvent for the polyphenylsulfone in a weight ratio in the range of 0.5:1 to 10:1, respectively. Within this range, the weight ratio of the solvent to the non-solvent can be in the range of 0.7:1 to 3:1.

In some embodiments, the solvent for the polyphenylsulfone and the non-solvent for the polyphenylsulfone are each halogen-free. In some embodiments, the solvent and the non-solvent for the polyphenylsulfone are each independently characterized by a flash point in the range of 25 to 120° C. in some embodiments, the solvent for the polyphenylsulfone and the non-solvent for the polyphenylsulfone are miscible at 23° C.

In the method, the solvent mixture is combined with an amorphous polyphenylsulfone powder. In some embodiments, amorphous polyphenylsulfone powder has a volume-based equivalent spherical diameter in the range of 10 to 400 micrometers, determined by laser diffraction according to ISO 13320-1. Within this range, the equivalent spherical diameter can be in the range of 10 to 200 micrometers, or in the range of 10 to 100 micrometers, or in the range of 30 to 90 micrometers, or in the range of 45 to 80 micrometers. The population of particles can have a Dv10 value in the range of 1 to 45 micrometers, and a Dv90 value in the range of 80 to 125 micrometers. The population of particles can have a polydispersity greater than 1 and less than 2, or greater than 1 and less than 1.5. Mastersizer™ particle size analyzers from Malvern Instruments are suitable laser diffraction instruments for determining particle size characteristics.

The solvent mixture and the amorphous polyphenylsulfone powder are combined in a weight ratio in the range of 1:1 to 100:1. Within this range, the weight ratio of the solvent mixture to the amorphous polyphenylsulfone powder can be in the range of 2:1 to 40:1, or in the range of 5:1 to 20:1.

The combined solvent mixture and amorphous polyphenylsulfone powder are agitated for a time of 5 to 500 minutes and at a temperature of 10 to 50° C. to form a dispersion of semicrystalline polyphenylsulfone particles. There is no particular limit on the type of agitation employed. An example of suitable agitation is agitation by rotary stirrer operating at 10 to 5,000 rotations per minute. Within the range of 5 to 500 minutes, the time can be 10 to 250 minutes. Within the range of 10 to 50° C., the temperature can be in the range of 15 to 40° C.

The method further comprises isolating the semicrystalline polyphenylsulfone particles from the dispersion. Suitable isolation methods include filtration, centrifugation, freeze drying, and combinations thereof. In some embodiments, the isolated semicrystalline polyphenylsulfone particles have a volume-based equivalent spherical diameter in the range of 10 to 400 micrometers, determined by laser diffraction according to ISO 13320-1. Within this range, the equivalent spherical diameter can be in the range of 10 to 200 micrometers, or in the range of 10 to 100 micrometers, or in the range of 30 to 90 micrometers, or in the range of 45 to 80 micrometers. The isolated semicrystalline polyphenylsulfone particles can have a Dv10 value in the range of 1 to 45 micrometers, and a Dv90 value in the range of 80 to 125 micrometers. The isolated semicrystalline polyphenylsulfone particles can have a polydispersity greater than 1 and less than 2, or greater than 1 and less than 1.5. Mastersizer™ particle size analyzers from Malvern Instruments are suitable laser diffraction instruments for determining particle size characteristics.

Optionally in this embodiment, the crystalline melting point is associated with an enthalpy of crystalline melting of at least 1 joule/gram.

In a very specific embodiment of the method, the amorphous polyphenylsulfone powder has a volume-based equivalent spherical diameter in the range of 10 to 400 micrometers, determined by laser diffraction according to ISO 13320-1; the solvent mixture and the amorphous polyphenylsulfone powder are combined in a weight ratio in the range of 2:1 to 40:1; the solvent mixture comprises the solvent for the polyphenylsulfone and the non-solvent for the polyphenylsulfone in a weight ratio in the range of 0.7:1 to 3:1, respectively; the solvent for the polyphenylsulfone is selected from the group consisting of dimethylacetamide, dimethylformamide, tetrahydrofuran, pyridine, and combinations thereof; the non-solvent for the polyphenylsulfone comprises methanol; and the isolated semicrystalline polyphenylsulfone particles have a volume-based equivalent spherical diameter in the range of 10 to 400 micrometers, determined by laser diffraction according to ISO 13320-1.

The semicrystalline polyphenylsulfone particles are useful for additive manufacturing. Additive manufacturing processes include powder bed additive manufacturing and powder fed additive manufacturing processes in which lasers or electrons are used to iteratively fuse layers of the semicrystalline polyphenylsulfone particles. Additive manufacturing processes can include, for example, three dimensional printing, laser-net-shape manufacturing, selective laser sintering (SLS), plasma transferred arc, freeform fabrication, high speed sintering, and jet fusion techniques. These processes may be described as additive manufacturing fusing processes. One exemplary type of additive manufacturing process uses a laser beam to fuse (e.g., sinter or melt) a powder material (e.g., using a powder bed process). Another exemplary type of additive manufacturing can comprise iteratively binding together a plurality of layers of additive material using a binder to produce a green state additively manufactured component, wherein the unmated binder can be subsequently removed. Additive manufacturing processes can employ powder materials or wire as a raw material. Moreover additive manufacturing processes can generally relate to a way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially fused (e.g., sintered or melted) to solidify the layer.

One embodiment is a method of additive manufacturing, the method comprising: depositing a first layer comprising semicrystalline polyphenylsulfone particles at a working area; irradiating the working area with first radiation effective to heat the first layer to a temperature below and within 10° C. of a crystalline melting onset temperature of the semicrystalline polyphenylsulfone particles; and selectively irradiating a portion of the working area with second radiation effective to heat the first layer to a temperature above a crystalline melting point of the semicrystalline polyphenylsulfone particles.

The method comprises depositing a first layer comprising semicrystalline polyphenylsulfone particles at a working area. The semicrystalline polyphenylsulfone particles can have any of the above-described variations in composition, crystallinity, and particle size. Particle deposition methods and devices are known for various additive manufacturing processes. For example, in selective laser sintering, a building area is located near one or more powder delivery modules. The building area may be a moveable stage or other platform disposed within a cylinder or other volume. A powder delivery module may likewise comprise a moveable stage or other platform disposed within a cylinder or other volume. In operation, a powder delivery platform is advanced so as to raise up an amount of powder above the top of the cylinder in which the powder delivery platform is disposed. A roller or other modality may then move (e.g., via sweeping or other motion) the powder that was advanced by the platform and then move that powder into the building area.

After the first layer comprising semicrystalline polyphenylsulfone particles is deposited at the working area, the working area is irradiated with first radiation effective to heat the first layer to a temperature below and within 10° C. of the crystalline melting onset temperature of the semicrystalline polyphenylsulfone particles. In some embodiments, the first layer is heated to a temperature below and within 5° C. of the crystalline melting onset temperature of the semicrystalline polyphenylsulfone particles. The crystalline melting onset temperature of the semicrystalline polyphenylsulfone particles can be determined according to ASTM D3418-15 by differential scanning calorimetry using a heating rate of 20° C./minute. The first radiation can be, for example, infrared radiation generated by a laser.

After the first layer has been irradiated with first radiation and heated to a temperature below and within 10° C. of the crystalline melting onset temperature, a portion of the working area is selectively irradiated with second radiation effective to heat the first layer to a temperature above the one or more crystalline melting points of the semicrystalline polyphenylsulfone particles. This second irradiation step causes the semicrystalline polyphenylsulfone particles to melt and fuse to form a molten polyphenylsulfone that, in some embodiments, has a zero-shear viscosity in the range of 10 to $10^4$ Pascal-second. The second radiation can be, for example, infrared radiation generated by a laser. In some embodiments, the second radiation comprises laser radiation at a wavelength of 10.6 micrometers.

The depositing step and the two irradiating steps can be repeated to effect layer-wise build up of the additively manufactured article. For example, after the working area with the first layer has been irradiated with the second radiation, a second layer comprising the semicrystalline polyphenylsulfone particles can be deposited at the working area, irradiated with the first radiation, and irradiated with the second irradiation.

In some embodiments of the method, the crystalline melting point is associated with an enthalpy of crystalline melting of at least 1 joule/gram.

In a very specific embodiment of the additive manufacturing method, the semicrystalline polyphenylsulfone has the structure

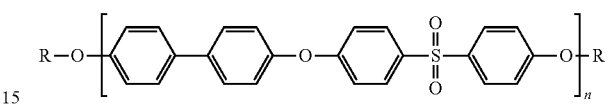

wherein n is, on average, in the range of 30 to 200, and each occurrence of R is methyl; and the second irradiation step causes the semicrystalline polyphenylsulfone particles to melt and fuse to form a molten polyphenylsulfone material that exhibits a zero-shear viscosity in the range of 10 to $10^4$ Pascal-second. Optionally in this embodiment, the crystalline melting point is associated with an enthalpy of crystalline melting of at least 1 joule/gram.

The invention includes at least the following aspects.

Aspect 1: A semicrystalline polyphenylsulfone, wherein the semicrystalline polyphenylsulfone has the structure

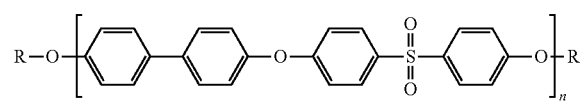

wherein n is, on average, 30 to 200, and each occurrence of R is independently $C_1$-$C_{18}$ alkyl or $C_1$-$C_{18}$ aryl; and wherein the semicrystalline polyphenylsulfone exhibits a crystalline melting point in a range of 215 to 270° C., determined according to ASTM D3418-15 by differential scanning calorimetry using a heating rate of 20° C./minute.

Aspect 2: The semicrystalline polyphenylsulfone of aspect 1, wherein a molten polyphenylsulfone obtained on melting the semicrystalline polyphenylsulfone exhibits a zero-shear viscosity in a range of 10 to $10^4$ Pascal-second determined according to ASTM D4440-15 at a temperature of 380° C.

Aspect 3: The semicrystalline polyphenylsulfone of aspect 1 or 2, in the form of particles having a volume-based equivalent spherical diameter of 10 to 400 micrometers, determined by laser diffraction according to ISO 13320-1.

Aspect 4: The semicrystalline polyphenylsulfone of any one of aspects 1-3, exhibiting two crystalline melting points in the range of 215 to 270° C.

Aspect 5: The semicrystalline polyphenylsulfone of aspect 1, wherein each occurrence of R is methyl; a molten polyphenylsulfone obtained on melting the semicrystalline polyphenylsulfone exhibits a zero-shear viscosity of 10 to $10^4$ Pascal-second determined according to ASTM D4440-15 at a temperature of 380 CC; the semicrystalline polyphenylsulfone is in the form of particles having a volume-based equivalent spherical diameter of 10 to 400 micrometers, determined by laser diffraction according to ISO 13320-1; and the semicrystalline polyphenylsulfone has a hydroxyl end group content greater than 0 and less than 50 parts per million by weight, based on the weight of the semicrystalline polyphenylsulfone.

Aspect 6: A method of forming a semicrystalline polyphenylsulfone, the method comprising: combining a solvent mixture with an amorphous polyphenylsulfone powder in a weight ratio of 1:1 to 100:1, respectively, to form a mixture; wherein the solvent mixture comprises a solvent for the polyphenylsulfone and a non-solvent for the polyphenylsulfone in a weight ratio of 0.5:1 to 10:1, respectively; agitating the mixture for a time of 5 to 500 minutes and at a temperature of 10 to 50° C. to form a dispersion of semicrystalline polyphenylsulfone particles; and isolating the semicrystalline polyphenylsulfone particles from the dispersion.

Aspect 7: The method of aspect 6, wherein the amorphous polyphenylsulfone powder has a volume-based equivalent spherical diameter of 10 to 400 micrometers, determined by laser diffraction according to ISO 13320-1.

Aspect 8: The method of aspect 6 or 7, wherein the isolated semicrystalline polyphenylsulfone particles have a volume-based equivalent spherical diameter of 10 to 400 micrometers, determined by laser diffraction according to ISO 13320-1.

Aspect 9: The method of any one of aspects 6-8, wherein the solvent for the polyphenylsulfone is characterized by a polarity of 4 to 8, and a boiling point at atmospheric pressure of 60 to 190° C.; and the non-solvent for the polyphenylsulfone is selected from the group consisting of $C_1$-$C_6$ alcohols, $C_3$-$C_6$ ketones, and combinations thereof.

Aspect 10: The method of any one of aspects 6-9, wherein the solvent for the polyphenylsulfone is selected from the group consisting of dimethylacetamide, dimethylformamide, tetrahydrofuran, pyridine, N-methyl-2-pyrrolidone, and combinations thereof.

Aspect 11: The method of any one of aspects 6-10, wherein the non-solvent for the polyphenylsulfone is selected from the group consisting of $C_1$-$C_6$ alcohols and combinations thereof.

Aspect 12: The method of aspect 6, wherein the amorphous polyphenylsulfone powder has a volume-based equivalent spherical diameter of 10 to 400 micrometers, determined by laser diffraction according to ISO 13320-1; wherein the solvent mixture and the amorphous polyphenylsulfone powder are combined in a weight ratio of 2:1 to 40:1; wherein the solvent mixture comprises the solvent for the polyphenylsulfone and the non-solvent for the polyphenylsulfone in a weight ratio of 0.7:1 to 3:1, respectively; wherein the solvent for the polyphenylsulfone is selected from the group consisting of dimethylacetamide, dimethylformamide, tetrahydrofuran, pyridine, N-methyl-2-pyrrolidone, and combinations thereof; wherein the non-solvent for the polyphenylsulfone comprises methanol; and wherein the isolated semicrystalline polyphenylsulfone particles have a volume-based equivalent spherical diameter of 10 to 400 micrometers, determined by laser diffraction according to ISO 13320-1.

Aspect 13: A method of additive manufacturing, the method comprising: depositing a first layer comprising the semicrystalline polyphenylsulfone particles of aspect 3 at a working area; irradiating the working area with first radiation effective to heat the first layer to a temperature below and within 10° C. of a crystalline melting onset temperature of the semicrystalline polyphenylsulfone particles; and selectively irradiating a portion of the working area with second radiation effective to heat the first layer to a temperature above a crystalline melting point of the semicrystalline polyphenylsulfone particles.

Aspect 14: The method of aspect 13, wherein the second radiation comprises laser radiation at a wavelength of 10.6 micrometers.

Aspect 15: The method of aspect 13 or 14, wherein each occurrence of R is methyl; and the irradiating the working area with second radiation produces molten polyphenylsulfone exhibiting a zero-shear viscosity of 10 to $10^4$ Pascal-second determined according to ASTM D4440-15 at a temperature of 380° C.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES

Materials used in these examples are summarized in Table 1.

TABLE 1

| Material | Description |
|---|---|
| PPSU | Amorphous polyphenylsulfone, CAS Reg. No. 25608-64-4, having a weight average molecular weight of 50,100 grams/mole and a number average molecular weight of 18,500 grams/mole, determined by gel permeation chromatography using polystyrene standard; having a hydroxyl group content less than 10 parts per million by weight; obtained in pellet form as RADEL ™ R5100-5 polyphenylsulfone from Solvay. |
| MeOH | Methanol, CAS Reg. No. 67-56-1, 99.8% pure; obtained from Fisher Scientific. |
| DMAC | N,N-Dimethylacetamide, CAS Reg. No. 127-19-5, 99.0% pure; obtained from Fisher Scientific. |
| DMF | N,N-Dimethylformamide, CAS Reg. No. 68-12-2, 99.9% pure; obtained from Fisher Scientific. |
| THF | Tetrahydrofuran, CAS Reg. No. 109-99-9, 99.9% pure; obtained from Fisher Scientific. |
| Pyridine | Pyridine, CAS Reg. No. 110-86-1, 99.5% pure; obtained from Merck. |
| NMP | N-Methyl-2-pyrrolidone, CAS Reg. No. 872-50-4, 99.5% pure; obtained from Acros Organics. |
| DMC | Dimethyl carbonate, CAS Reg. No. 616-38-6, 99.0% pure; obtained from Aldrich. |
| DEC | Diethyl carbonate, CAS Reg. No. 105-58-8, 99.0% pure; obtained from Aldrich. |

PPSU, which was obtained as pellets, was ground using a Retsch™ ZM 200 Ultra Centrifugal Mill to produce a powder having a volume-based equivalent spherical diameter of 200 to 300 micrometers. Particle size was determined by laser diffraction using a MASTERSIZER™ 2000 Particle Size Analyzer from Malvern Panalytical.

The FIGURE shows differential scanning calorimetry heating and cooling curves for the PPSU powder (i.e., RADEL™ R5100-5 polyphenylsulfone from Solvay). Differential scanning calorimetry was conducted according to ASTM D3418-15 using a heating rate of 20° C./minute. The heating and cooling curves each exhibit a glass transition. The heating curve did not exhibit a crystalline melting transition, and the cooling curve did not exhibit a transition associated with crystallization.

The same general procedure was used for all solvents and solvent mixtures. PPSU powder (100 grams) was gradually added to a 3 liter glass beaker containing 1,000 milliliters of the solvent or solvent mixture (solvent proportions are shown in Table 2, below) while stirring the mixture with a Silverson L5M Laboratory Mixer operating at 3500 rotations per minute. The fast moving rotor of the mixer forced the mixture through a screen with a U.S. mesh size of about 18 (opening size of about 1 millimeter), thereby applying extreme agitation to the mixture. This resulted in a finely dispersed mixture without visible agglomerations. The experiments were conducted at room temperature (about 23° C.).

After mixing for 60 minutes, the contents of the beaker were filtered through a Whatman 1440-150 filter (8 micrometer pore size, 150 millimeters diameter) using a water-jet pump and a Buchner funnel. The filtrate was washed at least two times with acetone, then left in a fume hood for a minimum of 4 hours after which it was dried in a vacuum oven overnight at 200° C. to remove residual solvent.

Table 2 summarizes results for crystallinity as a function of solvent composition, with each solvent having been tested at solvent-to-methanol weight ratios of 100:0, 70:30, and 50:50. The presence of crystallinity was determined by differential scanning calorimetry (DSC) using a TA Instruments DSC Q2000 calorimeter operating at a heating rate of 20° C./minute. In Table 2, "Yes" means that a crystalline melting transition was observed in the DSC first heating curve. Conversely, "No" means that no crystalline melting transition was observed in the DSC first heating curve. The results in Table 2 show that crystallinity was observed for DMAC, DMF, THF, and pyridine, each at solvent-to-methanol weight ratios of 70:30 and 50:50.

TABLE 2

| Solvent | Crystallinity at 100:0 solvent-to-methanol | Crystallinity at 70:30 solvent-to-methanol | Crystallinity at 50:50 solvent-to-methanol |
|---|---|---|---|
| DMAC | No | Yes | Yes |
| DMF | No | Yes | Yes |
| THF | No | Yes | Yes |
| Pyridine | No | Yes | Yes |
| NMP | No | No | Yes |
| DEC | No | No | No |
| DMC | No | No | No |

Table 3 summarizes DSC results for isolated solids as a function of solvent composition. All properties were determined according to ASTM D3418-15 using a heating rate of 20° C./minute. Glass transition temperatures ($T_g$, expressed in units of degrees centigrade) were determined from the second heating cycle. Crystalline melting points ($T_m^1$ and $T_m^2$, expressed in units of degrees centigrade), crystalline melting onset temperatures ($T_{m\ onset}^1$, expressed in units of degrees centigrade), and enthalpies of crystalline melting ($\Delta H^1$ and $\Delta H^2$, expressed in units of joules/gram) were determined from the first heating cycle.

TABLE 3

| | C. Ex. A | Ex. 1 | Ex. 2 |
|---|---|---|---|
| Solvent | 100 DMF | 70:30 DMF/MeOH | 50:50 DMF/MeOH |
| $T_g$ (° C.) | — | 224 | 224 |
| $T_m^1$ (° C.) | — | 228 | 222 |
| $\Delta H^1$ (J/g) | — | 3.4 | 2.1 |
| $T_{m\ onset}^1$ (° C.) | — | 223 | 217 |
| $T_m^2$ (° C.) | — | 250 | N/O* |
| $\Delta H^2$ (J/g) | — | 9.2 | N/O |
| Comment | PPSU dissolved; no PPSU isolated | polymorphic | monomorphic |

TABLE 3-continued

| | C. Ex. B | Ex. 3 | Ex. 3 |
|---|---|---|---|
| Solvent | 100 DMAC | 70:30 DMAC/MeOH | 50:50 DMAC/MeOH |
| $T_g$ (° C.) | — | 224 | 224 |
| $T_m^1$ (° C.) | — | 234 | 228 |
| $\Delta H^1$ (J/g) | — | 3.3 | 3.5 |
| $T_{m\ onset}^1$ (° C.) | — | 223 | 221 |
| $T_m^2$ (° C.) | — | 253 | N/O |
| $\Delta H^2$ (J/g) | — | 11.7 | N/O |
| Comment | PPSU dissolved; no PPSU isolated | polymorphic | monomorphic |

| | C. Ex. C | Ex. 5 | Ex. 6 |
|---|---|---|---|
| Solvent | 100 Pyr | 70:30 Pyr/MeOH | 50:50 Pyr/MeOH |
| $T_g$ (° C.) | — | 224 | 224 |
| $T_m^1$ (° C.) | — | 231 | 225 |
| $\Delta H^1$ (J/g) | — | 1.3 | 3.6 |
| $T_{m\ onset}^1$ (° C.) | — | 217 | 221 |
| $T_m^2$ (° C.) | — | 255 | N/O |
| $\Delta H^2$ (J/g) | — | 20.2 | N/O |
| Comment | PPSU dissolved; no PPSU isolated | polymorphic | monomorphic |

| | C. Ex. D | Ex. 7 | Ex. 8 |
|---|---|---|---|
| Solvent | 100 THF | 70:30 THF/MeOH | 50:50 THF/MeOH |
| $T_g$ (° C.) | — | 224 | 224 |
| $T_m^1$ (° C.) | — | 235 | 223 |
| $\Delta H^1$ (J/g) | — | 3.5 | 2.0 |
| $T_{m\ onset}^1$ (° C.) | — | 225 | 217 |
| $T_m^2$ (° C.) | — | 250 | N/O |
| $\Delta H^2$ (J/g) | — | 9.2 | N/O |
| Comment | PPSU dissolved; no PPSU isolated | polymorphic | monomorphic |

| | C. Ex. E | C. Ex. F | Ex. 9 |
|---|---|---|---|
| Solvent | 100 NMP | 70:30 NMP/MeOH | 50:50 NMP/MeOH |
| $T_g$ (° C.) | — | — | 224 |
| $T_m^1$ (° C.) | — | — | 227 |
| $\Delta H^1$ (J/g) | — | — | 3.6 |
| $T_{m\ onset}^1$ (° C.) | — | — | 218 |
| $T_m^2$ (° C.) | — | — | 252 |
| $\Delta H^2$ (J/g) | — | — | 5.9 |
| Comment | PPSU dissolved; no PPSU isolated | PPSU dissolved; no PPSU isolated | polymorphic |

N/O = not observed

These examples above collectively show that it is possible to generate crystallinity in previously amorphous PPSU by exposing amorphous PPSU particles to a mix of a solvent for PPSU and a non-solvent for PPSU. Depending on the solvent/non-solvent mixture, the resulting PPSU can exhibit one or two crystalline inciting points.

Table 4 presents complex viscosity values (expressed in units of Pascal-second) for PPSU at 380° C. as a function of angular frequency (expressed in units of radians/second). The corresponding experiments were conducted according to ASTM D4440-15. Based on these results, the estimated zero-shear viscosity at 380° C. for PPSU is 1780 Pascal-seconds.

TABLE 4

| Angular Frequency (rad/s) | Complex Viscosity (Pa · s) |
| --- | --- |
| 100.0 | 599 |
| 63.1 | 667 |
| 39.8 | 734 |
| 25.1 | 798 |
| 15.8 | 856 |
| 10.0 | 906 |
| 6.3 | 949 |
| 4.0 | 981 |
| 2.5 | 1012 |
| 1.6 | 1033 |
| 1.0 | 1054 |
| 0.6 | 1090 |
| 0.4 | 1147 |
| 0.3 | 1214 |
| 0.2 | 1334 |
| 0.1 | 1581 |

Table 5 presents low shear melt strength viscosity ratios determined at 380° C. according to ASTM D4440-15. For additive manufacturing, it is preferred that the ratio of viscosities at 10 and 100 radians/second is at least 1.5, the ratio of viscosities at 1 and 100 radians per second is at least 1.75, and the ratio of viscosities at 0.1 and 100 radians/second is at least 2.0. All three criteria are satisfied by PPSU. This means that in an additive manufacturing method utilizing semicrystalline PPSU, molten PPSU has sufficient melt strength to hold its shape while solidification occurs.

TABLE 5

| Angular Frequencies (rad/s) | Viscosity Ratio |
| --- | --- |
| 10:100 | 1.51 (906/599) |
| 1:100 | 1.76 (1054/599) |
| 0.1:100 | 2.64 (1581/599) |

The invention claimed is:

1. A semicrystalline polyphenylsulfone,
wherein the semicrystalline polyphenylsulfone has the structure

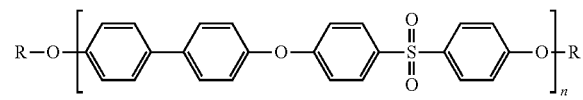

wherein n is, on average, 30 to 200, and each occurrence of R is independently $C_1$-$C_{18}$ alkyl or $C_6$-$C_{18}$ aryl; and
wherein the semicrystalline polyphenylsulfone exhibits a crystalline melting point in a range of 215 to 270° C., determined according to ASTM D3418-15 by differential scanning calorimetry using a heating rate of 20° C./minute, wherein the semicrystalline polyphenylsulfone is produced by a method comprising: combining a solvent mixture with an amorphous polyphenylsulfone powder in a weight ratio of 1:1 to 100:1, respectively, to form a mixture; wherein the solvent mixture comprises a solvent for the polyphenylsulfone and a non-solvent for the polyphenylsulfone in a weight ratio of 0.5:1 to 10:1, respectively; agitating the mixture for a time of 5 to 500 minutes and at a temperature of 10 to 50° C. to form a dispersion of semicrystalline polyphenylsulfone particles; and isolating the semicrystalline polyphenylsulfone particles from the dispersion.

2. The semicrystalline polyphenylsulfone of claim 1, wherein a molten polyphenylsulfone obtained on melting the semicrystalline polyphenylsulfone exhibits a zero-shear viscosity in a range of 10 to $10^4$ Pascal-second determined according to ASTM D4440-15 at a temperature of 380° C.

3. Particles comprising the semicrystalline polyphenylsulfone of claim 1, wherein the particles have a volume-based equivalent spherical diameter (Dv50) of 10 to 400 micrometers, determined by laser diffraction according to ISO 13320-1, or the particles have a Dv50 value of 45 to 80 micrometers and a Dv10 value of 1 to 45 micrometers and a Dv90 value of 80 to 125 micrometers determined by laser diffraction according to ISO 13320-1.

4. The semicrystalline polyphenylsulfone of claim 1, exhibiting two crystalline melting points in the range of 215 to 270° C.

5. The semicrystalline polyphenylsulfone of claim 1, wherein each occurrence of R is methyl;
a molten polyphenylsulfone obtained on melting the semicrystalline polyphenylsulfone exhibits a zero-shear viscosity of 10 to $10^4$ Pascal-second determined according to ASTM D4440-15 at a temperature of 380° C.;
the semicrystalline polyphenylsulfone is in the form of particles having a volume-based equivalent spherical diameter of 10 to 400 micrometers, determined by laser diffraction according to ISO 13320-1; and
the semicrystalline polyphenylsulfone has a hydroxyl end group content greater than 0 and less than 50 parts per million by weight, based on the weight of the semicrystalline polyphenylsulfone.

6. A method of forming a semicrystalline polyphenylsulfone, the method comprising:
combining a solvent mixture with an amorphous polyphenylsulfone powder in a weight ratio of 1:1 to 100:1, respectively, to form a mixture; wherein the solvent mixture comprises a solvent for the polyphenylsulfone and a non-solvent for the polyphenylsulfone in a weight ratio of 0.5:1 to 10:1, respectively;
agitating the mixture for a time of 5 to 500 minutes and at a temperature of 10 to 50° C. to form a dispersion of semicrystalline polyphenylsulfone particles; and
isolating the semicrystalline polyphenylsulfone particles from the dispersion.

7. The method of claim 6, wherein the amorphous polyphenylsulfone powder has a volume-based equivalent spherical diameter of 10 to 400 micrometers, determined by laser diffraction according to ISO 13320-1.

8. The method of claim 6, wherein the isolated semicrystalline polyphenylsulfone particles have a volume-based equivalent spherical diameter of 10 to 400 micrometers, determined by laser diffraction according to ISO 13320-1.

9. The method of claim 6, wherein
the solvent for the polyphenylsulfone is characterized by a polarity of 4 to 8, and a boiling point at atmospheric pressure of 60 to 190° C.; and
the non-solvent for the polyphenylsulfone is selected from the group consisting of $C_1$-$C_6$ alcohols, $C_3$-$C_6$ ketones, and combinations thereof.

10. The method of claim 6, wherein the solvent for the polyphenylsulfone is selected from the group consisting of dimethylacetamide, dimethylformamide, tetrahydrofuran, pyridine, N-methyl-2-pyrrolidone, and combinations thereof.

11. The method of claim 6, wherein the non-solvent for the polyphenylsulfone is selected from the group consisting of $C_1$-$C_6$ alcohols and combinations thereof.

12. The method of claim 6,
wherein the amorphous polyphenylsulfone powder has a volume-based equivalent spherical diameter of 10 to 400 micrometers, determined by laser diffraction according to ISO 13320-1;
wherein the solvent mixture and the amorphous polyphenylsulfone powder are combined in a weight ratio of 2:1 to 40:1;
wherein the solvent mixture comprises the solvent for the polyphenylsulfone and the non-solvent for the polyphenylsulfone in a weight ratio of 0.7:1 to 3:1, respectively;
wherein the solvent for the polyphenylsulfone is selected from the group consisting of dimethylacetamide, dimethylformamide, tetrahydrofuran, pyridine, N-methyl-2-pyrrolidone, and combinations thereof;
wherein the non-solvent for the polyphenylsulfone comprises methanol; and
wherein the isolated semicrystalline polyphenylsulfone particles have a volume-based equivalent spherical diameter of 10 to 400 micrometers, determined by laser diffraction according to ISO 13320-1.

13. A method of additive manufacturing, the method comprising:
depositing a first layer comprising the semicrystalline polyphenylsulfone particles of claim 3 at a working area;
irradiating the working area with first radiation effective to heat the first layer to a temperature below and within 10° C. of a crystalline melting onset temperature of the semicrystalline polyphenylsulfone particles; and
selectively irradiating a portion of the working area with second radiation effective to heat the first layer to a temperature above a crystalline melting point of the semicrystalline polyphenylsulfone particles.

14. The method of claim 13, wherein the second radiation comprises laser radiation at a wavelength of 10.6 micrometers.

15. The method of claim 13, wherein
each occurrence of R is methyl; and
the irradiating the working area with second radiation produces molten polyphenylsulfone exhibiting a zero-shear viscosity of 10 to $10^4$ Pascal-second determined according to ASTM D4440-15 at a temperature of 380° C.

* * * * *